United States Patent [19]
Choi

[11] Patent Number: 5,909,140
[45] Date of Patent: Jun. 1, 1999

[54] CIRCUIT FOR CONTROLLING THE THRESHOLD VOLTAGE IN A SEMICONDUCTOR DEVICE

[75] Inventor: Jin Kook Choi, Kyoungkido, Rep. of Korea

[73] Assignee: Hyundai Electronics Industries Co., Ltd., Rep. of Korea

[21] Appl. No.: 08/884,347

[22] Filed: Jun. 27, 1997

[30] Foreign Application Priority Data

Jun. 29, 1996 [KR] Rep. of Korea ...................... 96-26542

[51] Int. Cl.⁶ ................................ H03K 3/01; G05F 3/16
[52] U.S. Cl. ........................ 327/534; 327/535; 327/537
[58] Field of Search ................................. 327/534, 535, 327/536, 537, 202, 215

[56] References Cited

U.S. PATENT DOCUMENTS

| | | | |
|---|---|---|---|
| 4,964,082 | 10/1990 | Sato et al. | 327/354 |
| 5,003,197 | 3/1991 | Nojima et al. | 327/536 |
| 5,034,625 | 7/1991 | Min et al. | 327/537 |
| 5,113,088 | 5/1992 | Yamamoto et al. | 327/536 |
| 5,264,808 | 11/1993 | Tanaka | 331/57 |
| 5,394,026 | 2/1995 | Yu et al. | 327/536 |
| 5,461,338 | 10/1995 | Hirayama et al. | 327/534 |
| 5,602,506 | 2/1997 | Kim et al. | 327/535 |
| 5,744,997 | 4/1998 | Kang et al. | 327/537 |

*Primary Examiner*—Timothy P. Callahan
*Assistant Examiner*—An T. Luu
*Attorney, Agent, or Firm*—Blakely Sokoloff Taylor & Zafman

[57] ABSTRACT

A circuit for controlling the threshold voltage in a semiconductor device. The circuit includes a substrate bias sensing block, and oscillater, a charge pump and a current supplying transistor. The substrate bias sensing block prevents substrate bias from decreasing below a predetermined value and includes a voltage divider including a plurality of PMOS transistors coupled in series between a power supply and the substrate bias, wherein each first junction of each transistor is connected with the substrate and each second junction with each gate. The block includes a latch being applied by the voltage of the first junction of one of the PMOS transistors and the inverted voltage of the corresponding second junction. A very low subthreshold leakage current can be obtained by maintaining a high threshold voltage in the standby mode, and low power consumption and high speed operation can be accomplished by lowering the threshold voltage with the low supplied power in the operation mode.

4 Claims, 4 Drawing Sheets

CIRCUIT FOR CONTROLLING THE THRESHOLD VOLTAGE IN A SEMICONDUCTOR DEVICE

BACKGROUND OF THE INVENTION

1. Field of the Invention

The present invention relates to a circuit for controlling the threshold voltage in a semiconductor device, and more particularly to a circuit for increasing the threshold voltage only when a semiconductor device is standing by, preventing increment of subthreshold leakage current generated in which uses the low threshold voltage for a high speed operation of the semiconductor

2. Description of the Prior Art

Recently, with the light weight and miniaturization of electronic devices, high speed operation and low power consumption semiconductor devices have been required. Furthermore, it is also required that the semiconductor devices particularly, using a battery, should be designed to lower their power consumption while they are standing by.

In general, lowering a supply power leads to lower power consumption of the semiconductor devices, and lowering a threshold voltage enables the semiconductor devices to operate at a high speed.

In the stand-by mode, however, lowering a threshold voltage causes increment of the subthreshold leakage currents, thereby cutting down the expected life span of the battery, with a high speed operation of the semiconductor devices.

SUMMARY OF THE INVENTION

Therefore, an object of the present invention is to provide a circuit capable of controlling the threshold voltage in a semiconductor device for minimizing the subthreshold leakage current resulted from power consumption at a low threshold voltage,, by increasing the threshold voltage at its stand-by mode, and by decreasing the threshold voltage at its operation mode.

According to an aspect of the present invention, there is provided a circuit for controlling the threshold voltage in a semiconductor device comprising: a substrate bias sensing unit for, preventing the substrate bias from decreasing below a predetermined value; and a substrate bias controlling unit for controlling the threshold voltage in response to the output of said substrate bias, sensing unit and a stand-by/operation mode control signal.

According to another aspect of the present invention, there is provided a substrate bias controlling unit comprising: an oscillating means for outputting an oscillation frequency in response to the output of said substrate bias controlling unit and the stand-by/operation mode control signal; a pumping means, for pumping substrate charges in response to the oscillation frequency to lower the substrate bias; and a current supplying means for supplying current to increase the substrate bias in response to the stand-by/operation mode control signal.

According to further another aspect of the present invention, there is provided a substrate bias sensing unit comprising: a voltage divider including a plurality of PMOS transistors coupled in series between a power supply and the substrate bias, wherein a first junction of each of them is connected to the substrate and, a second junction to the gate; and a latching means being applied the voltage of the first junction of one of the PMOS transistors and the inverted-voltage of the second junction.

BRIEF DESCRIPTION OF THE; DRAWINGS

These objects, features and advantages of the present invention will more fully apparent from the description of an embodiment with reference to the accompanying drawings, in which, FIG. 1 is a schematic block diagram illustrating a threshold voltage controlling circuit according to an embodiment of the invention;

DETAILED DESCRIPTION OF THE PREFERRED EMBODIMENTS

An embodiment of the present invention will be described in detail with reference to accompanying drawings.

Figure 1:
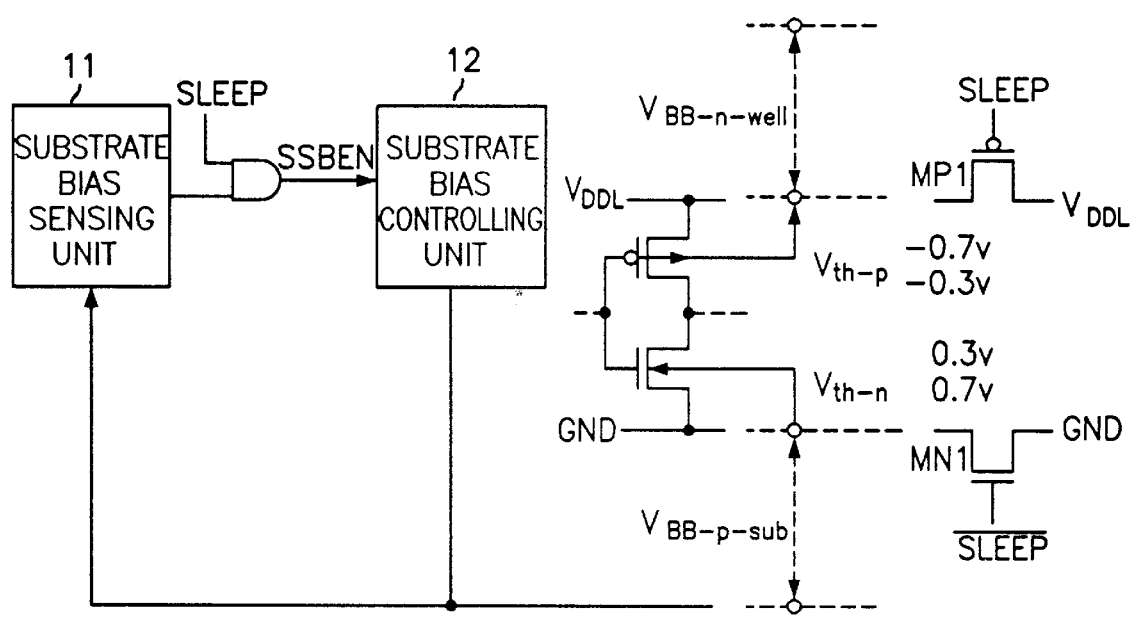

As shown in FIG. 1, in the case of controlling the threshold voltage $V_{th-n}$ of NMOS transistors, a substrate bias sensing unit 11 outputs a high level signal initially. When a semiconductor device is in the stand-by mode, the stand-by/operation mode control signal SLEEP is at a high level. A substrate bias controlling unit 12 is enabled, and then it pumps out about 100 $\mu$A current from the, substrate until the substrate bias $V_{BB-p-sub}$ corresponding to the difference of the ground voltage and the substrate voltage is about −2 V. As a result, the threshold voltage is upraised from 0.3 V to 0.7 V according as the substrate bias $V_{BB-p-sub}$ is lowered from 0 V to −2 V. If the substrate bias $V_{BB-p-sub}$ is lowered below a predetermined value, the substrate bias sensing unit 11 outputs a low level signal and the substrate bias controlling unit 12 is disabled.

On the other hand, when a semiconductor device is in the operation mode, the stand-by/operation mode control signal SLEEP is at a low level. The substrate bias controlling unit 12 is disabled, and then the current flows into the substrate from MOS (metal oxide semiconductor) transistors MN1. As a result, the threshold voltage is lowered from 0.7 V to 0.3 V according as the substrate bias $V_{BB-p-sub}$ is upraised from −2 v to 0 V.

The Control of the threshold voltage $V_{th-p}$ in PMOS transistors is performed in a similar principle to the one mentioned above. That is, the control of the threshold voltage $V_{th-p}$ in the range of −0.3 V to −0.7 V is performed by controlling the substrate bias corresponding to the difference between the substrate voltage and supply voltage $V_{DDL}$.

AS a result, the changes of the threshold voltage of the semiconductor device are performed by controlling the substrate bias applied to NMOS and PMOS transistors. In case of NMOS transistors, in the operation mode (the substrate bias is, 0 V), the threshold voltage maintains 0.3 V. On the other hand, in the standby mode, (the back bias voltage is now −2 V), the threshold voltage is upraised to 0.7 V.

Figure 2:
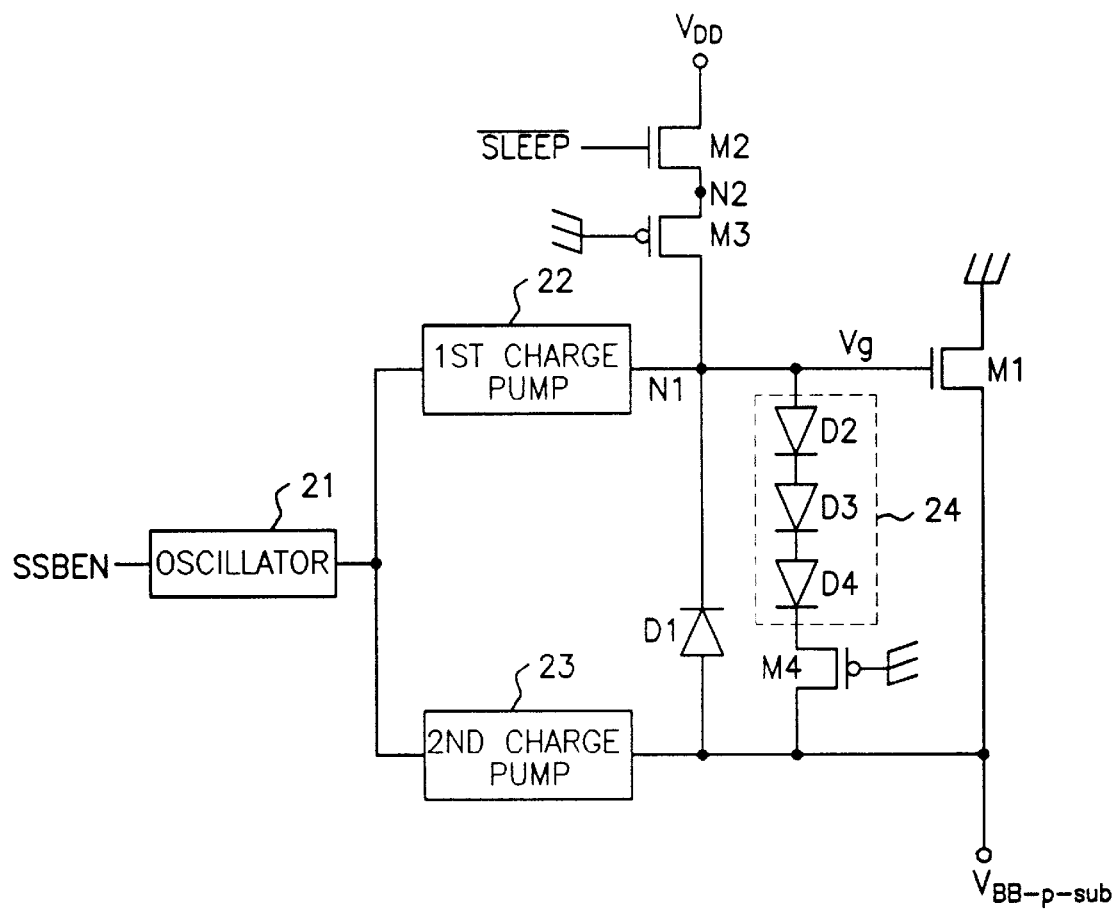
FIG. 2 is a schematic block diagram illustrating a substrate bias controlling unit in FIG. 1.

As shown in FIG. 2, in which there are shown an example of the substrate bias controlling unit for controlling the threshold, voltage $V_{th-n}$ of NMOS transistors in FIG. 1, the substrate bias controlling unit of an embodiment of the invention, comprises an oscillator 21 for outputting an oscillating frequency to drive a charge pump in response to the substrate bias enable signal SSBEN, and a first and a second charge pumps 22 and 23 for pumping the substrate charges to lower the substrate bias $V_{BB-p-sub}$ in response to the oscillating frequency.

For increasing the substrate bias $V_{BB-p-sub}$ the substrate bias controlling unit comprises an NMOS transistor M1 for supplying current into the substrate and an NMOS transistor M2 for controlling NMOS transistor MI in response to the stand-by/active mode control signal/SLEEP.

Also, the substrate bias controlling unit further comprises a diode D1 fox electrically connecting the substrate to the first change pump 22 only when the substrate bias controlling unit is standing by, a voltage clamping unit 24 for preventing the damage to the gate oxide of the NMOS transistor M1, a PMOS transistor M4 connecting the substrate to the clamping unit 24 for limiting the, gate current of the NMOS transistor M1, and a PMOS transistor M3 for keeping the voltage at node N2 higher than the ground voltage for the normal operation of the NMOS transistor M2.

Furthermore, the voltage clamping unit 24 includes diodes D2, D3 and D4 connected in series, by which the gate voltage Vg of the NMOS transistor M1 is not more than the Sum of 2.4 V and the substrate bias $V_{BB-p-sub}$.

In the stand-by mode, the stand-by/operation mode control signal/SLEEP is at a low level, then the gate voltage Vg has to be lower than the substrate bias $V_{BB-p-sub}$ to turn off the NMOS transistor M1. Because the parasitic capacitance at node N1 is far lower than that at the substrate, the voltage at node N1 is lowered more quickly than the substrate bias $V_{BB-p-sub}$ while each of the charge pumps 22 and 23 are operating. Therefore, the gate voltage Vg becomes $V_{BB-p-sub}$ −0.8 V and the NMOS transistor M1 is turned off.

In the operation mode, the stand-by/operation mode control signal/SLEEP is at a high level, the first and second charge pumps 22 and 23 stop their operation and then the NMOS transistor M2 is turned-on, by which the NMOS transistor M1 is turned-on in accordance with the rising of the gate voltage Vg. A lot of current flows into the substrate and then the substrate bias $V_{BB-p-sub}$ is changed from −2 V to 0 V.

These mentioned above can be made sure through FIGS. 3A and FIG. 3B.

Figure 3A:
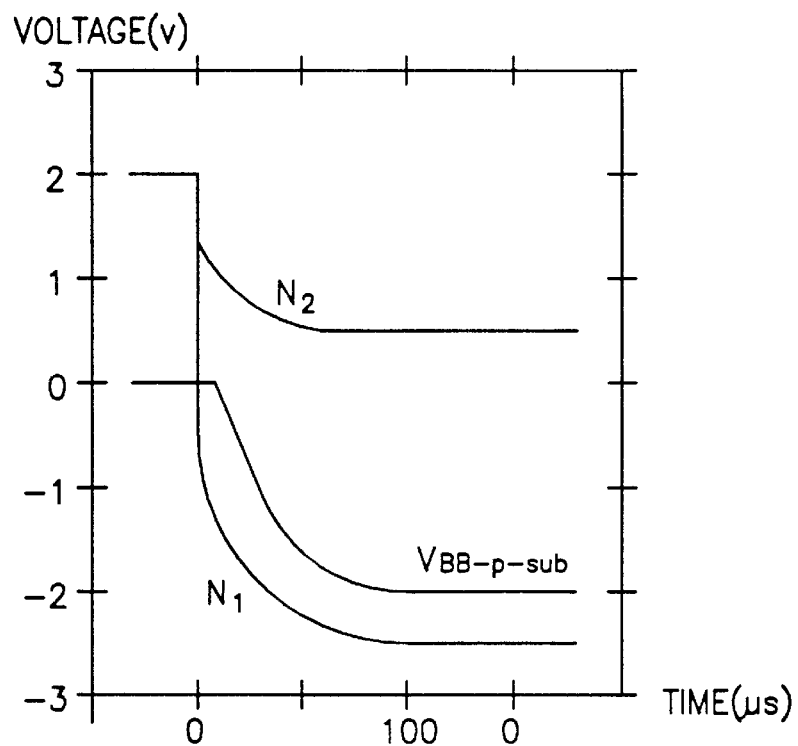
FIG. 3A are voltage curves illustrating the voltage change of the substrate bias controlling unit in FIG. 2 when the operation mode is converted into the stand-by mode.

FIG. 3A is a voltage curve illustrating the voltage change of the nodes N1 and N2 and the substrate bias $V_{BB-p-sub}$ in the substrate bias controlling unit in FIG. 2 when the operation mode is converted into the stand-by mode.

Figure 3B:
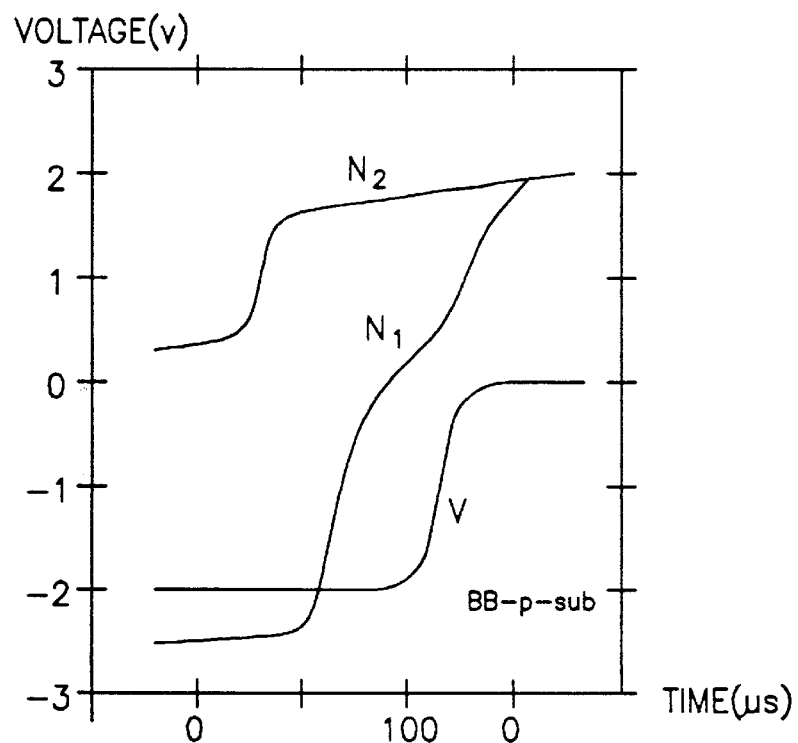
FIG. 3B are voltage curves illustrating the voltage change of the substrate bias controlling unit in FIG. 2 when a stand-by mode is converted into an operation mode.

FIG. 3B is a voltage curve illustrating the voltage change, at the nodes N1 and N2 and the substrate bias $V_{BB-p-sub}$ in the substrate bias controlling unit in FIG. 2 when the stand-by mode is converted into the operation mode.

Figure 4:
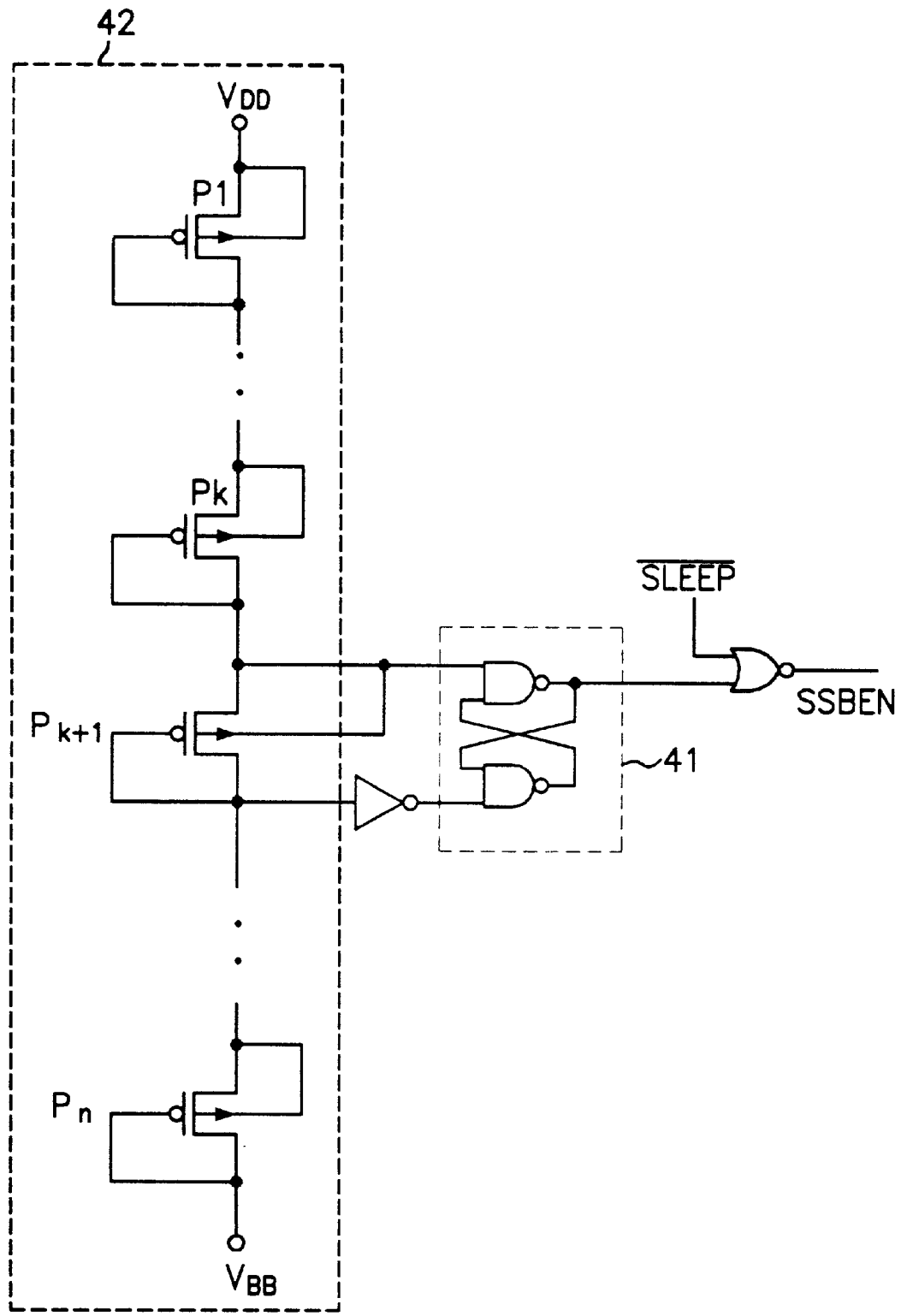
FIG. 4 is a schematic block diagram illustrating the substrate bias sensing unit in FIG. 1.

As shown in FIG. 4, the voltage divider 42 comprises a series of PMOS transistors P1, Pk, Pk+1, Pn, each of which is diode-connected, and the gate voltage of each of them is in a range not more than the threshold voltage, thereby gerating a little drain current. Then the same voltage is divided into each of them. The latch 41 connected to the voltage divider 42 (in detail, to the junctions of the PMOS transistor Pk+1) and the circuit is insensitive to the noises by introducing the hysteresis characteristic to the DC characteristic. Therefore, there are only a little change of the threshold voltage caused by the fabricating processes and the change of temperature.

As mentioned above, the present invention is distinguished from the prior art that has adopted the fixed threshold voltage and the circuit for controlling the threshold voltage of semiconductor device of the present invention occupies a very small area as, compared with the whole chip.

According to the present invention, a very low subthreshold leakage current can be maintained by high threshold voltage in the stand-by mode, and low power consumption and high speed operation can be accomplished by lowering the threshold voltage with the low supply power in the operation mode.

The invention has been described in detail with particular reference to a presently preferred embodiment, but it will be understood that variations and modifications can be effected within the spirit and scope of the invention.

What is claimed is:

1. A circuit for controlling threshold voltage in a semiconductor device comprising:

a substrate bias sensing unit for preventing a substrate bias from decreasing below a predetermined value; and a substrate bias controlling unit for controlling the threshold voltage in response to an output of said substrate bias sensing unit and a standby/operation mode control signal, wherein said substrate bias sensing unit comprises:

a voltage divider including a plurality of PMOS transistors coupled in series between a power supply and the substrate bias, wherein a first junction of each of said PMOS transistors is connected to the substrate and a second junction of each of said PMOS transistors is connected to its gate; and a latching means to which is applied the voltage of the first junction of one of the PMOS transistors and the inverted voltage of the second junction.

2. A circuit according to claim 1, wherein the said substrate bias controlling unit further comprises a clamping means for preventing an over voltage from being applied to said current supplying means.

3. A circuit according to claim 1, wherein said current supplying means comprises an NMOS transistor coupling the substrate and a ground voltage.

4. A circuit according to claim 1, wherein said substrate bias controlling unit comprises:

an oscillating means for outputting an oscillation frequency in response to the output of said substrate bias sensing unit and the standby/operation mode control signal;

a pumping means for pumping substrate charges in response to the oscillation frequency to lower the substrate bias; and a current supplying means for supplying current into the substrate to increase the substrate bias in response to the standby/operation mode control signal.

* * * * *

UNITED STATES PATENT AND TRADEMARK OFFICE
CERTIFICATE OF CORRECTION

PATENT NO.    : 5,909,140
DATED         : June 1, 1999
INVENTOR(S)   : Choi

It is certified that error appears in the above-identified patent and that said Letters Patent is hereby corrected as shown below:

Column 1,
Line 12, delete "operation of the semiconductor" and insert --operation of the semiconductor device.--.
Line 34, delete "threshold voltage,," and insert --threshold voltage,--.
Line 40, delete "unit for," and insert --unit for--.
Line 43, delete "substrate bias," and insert --substrate bias--.
Line 50, delete "a pumping means," and insert --a pumping means--.
Line 60, delete "the substrate and," and insert --the substrate and --.
Line 62, delete "transistors and the inverted- "and insert --transistors and the inverted--.

Column 2,
Line 1, delete "OF THE; DRAWINGS" and insert -- OF THE DRAWINGS --.
Line 29, delete "from the, substrate" and insert --from the substrate--.
Line 50, delete "bias corresponding" and insert --bias BB-n-well corresponding--.
Line 53, delete "AS a result" and insert -- As a result--.
Line 57, delete "substrate bias is," and insert --substrate bias is --.
Line 58, delete "standby mode," and insert --standby mode --.
Line 63, delete "threshold, voltage" and insert --threshold voltage--.

UNITED STATES PATENT AND TRADEMARK OFFICE
CERTIFICATE OF CORRECTION

PATENT NO.   : 5,909,140
DATED        : June 1, 1999
INVENTOR(S)  : Choi

It is certified that error appears in the above-identified patent and that said Letters Patent is hereby corrected as shown below:

Column 3,
Line 2, delete "invention, comprises" and insert --invention comprises--.
Line 15, delete "first change pump" and insert --first charge pump--.
Line 19, delete "limiting the, gate" and insert --limiting the gate--.

Column 4,
Line 10, delete "area as, compared" and insert --area as compared--.

Signed and Sealed this

Third Day of July, 2001

*Nicholas P. Godici*

Attest:

NICHOLAS P. GODICI
*Attesting Officer*   *Acting Director of the United States Patent and Trademark Office*